United States Patent
Oh

(10) Patent No.: US 8,303,001 B2
(45) Date of Patent: Nov. 6, 2012

(54) PIPE CONNECTOR

(75) Inventor: Seung-il Oh, Seoul (KR)

(73) Assignee: Kofulso Co., Ltd., Seo-Gu, Incheon-Si (KR)

( * ) Notice: Subject to any disclaimer, the term of this patent is extended or adjusted under 35 U.S.C. 154(b) by 785 days.

(21) Appl. No.: 12/318,949

(22) Filed: Jan. 13, 2009

(65) Prior Publication Data

US 2010/0176587 A1    Jul. 15, 2010

(51) Int. Cl.
*F16L 19/08* (2006.01)
*F16L 19/10* (2006.01)

(52) U.S. Cl. ........... 285/340; 285/39; 285/353; 285/385

(58) Field of Classification Search .................. 285/340, 285/353, 392, 39, 384, 385, 393
See application file for complete search history.

(56) References Cited

U.S. PATENT DOCUMENTS

| | | | |
|---|---|---|---|
| 2,186,974 A * | 1/1940 | Ice | 285/340 |
| 3,365,219 A * | 1/1968 | Nicolaus | 285/340 |
| 3,367,684 A * | 2/1968 | Anderson | 285/340 |
| 3,467,413 A | 9/1969 | Madrelle | |
| 3,633,944 A * | 1/1972 | Hamburg | 285/81 |
| 3,669,474 A | 6/1972 | Bode | |
| 3,679,241 A * | 7/1972 | Hoffmann | 285/340 |
| 3,693,664 A | 9/1972 | Schmunk | |
| 3,699,684 A | 10/1972 | Sixt | |
| 3,747,960 A | 7/1973 | Bawa | |
| 3,781,041 A | 12/1973 | Petzetakis | |
| 3,785,682 A | 1/1974 | Schaller et al. | |
| 3,953,057 A | 4/1976 | Petzetakis | |
| 3,958,719 A | 5/1976 | Ward | |
| 4,037,626 A | 7/1977 | Roberts, Jr. | |
| 4,082,327 A | 4/1978 | Sting et al. | |
| 4,141,576 A | 2/1979 | Lupke et al. | |
| 4,149,740 A | 4/1979 | Hall | |
| 4,202,568 A | 5/1980 | Strom | |
| 4,247,136 A | 1/1981 | Fouss et al. | |
| 4,304,415 A | 12/1981 | Wolf et al. | |
| 4,368,894 A | 1/1983 | Parmann | |
| 4,437,691 A | 3/1984 | Laney | |
| 4,443,031 A | 4/1984 | Borsh et al. | |
| 4,542,922 A | 9/1985 | Grossauer | |
| 4,591,193 A | 5/1986 | Oltmanns et al. | |
| 4,702,502 A | 10/1987 | Shade et al. | |
| 4,779,651 A | 10/1988 | Hegler et al. | |
| 4,842,309 A * | 6/1989 | LaVene et al. | 285/319 |

(Continued)

FOREIGN PATENT DOCUMENTS

WO    WO 9425786 A1 * 11/1994

*Primary Examiner* — James Hewitt
(74) *Attorney, Agent, or Firm* — Jacobson Holman PLLC

(57) ABSTRACT

A pipe connector including a connection member having a through-hole extending from a connection hole on one side to a coupling hole by way of an insertion hole in a stepped manner, a packing member fitted into the coupling hole, a guide member provided rearwards from the packing member with a tapered opening formed therein, a clamp member fitted into the tapered opening with a plurality of clamp pieces which are slanted so as to bite an outer circumference of a pipe, and a fastening member coupled to the connection member with a fixing section provided on one side with an inclined fixing protrusion protruding towards inside from the fixing section so as to push up the clamp pieces when inserted into the clamp pieces.

5 Claims, 13 Drawing Sheets

U.S. PATENT DOCUMENTS

| | | | |
|---|---|---|---|
| 4,895,395 A * | 1/1990 | Ceriani | 285/39 |
| 4,913,473 A | 4/1990 | Bonnema et al. | |
| 5,553,901 A * | 9/1996 | Serot | 285/340 |
| 5,988,690 A * | 11/1999 | Bogard | 285/24 |
| 6,145,887 A * | 11/2000 | Cambot-Courrau | 285/4 |
| 6,174,002 B1 * | 1/2001 | Rho | 285/340 |
| 7,273,235 B2 * | 9/2007 | Coquard et al. | 285/308 |
| 7,530,606 B1 * | 5/2009 | Yang | 285/340 |
| 2004/0070198 A1 * | 4/2004 | Rohrig | 285/39 |
| 2004/0245766 A1 * | 12/2004 | Vallee | 285/39 |
| 2005/0077723 A1 * | 4/2005 | Wai | 285/93 |
| 2007/0108764 A1 * | 5/2007 | Nicolino | 285/340 |

\* cited by examiner

PIPE CONNECTOR

BACKGROUND OF THE INVENTION

1. Field of the Invention

The present invention relates, in general, to a one-touch fitting pipe connector which is able to, only upon insertion, firmly connect a pipe in an airtight manner without the pushing backwards of a clamp member.

2. Description of the Related Art

Generally, a pipe connector of the related art is configured such that as illustrated in FIG. 1, when a corrugated pipe f is fitted into a connection member a by fastening a nut e to the connection member a with a packing b and a clamp member c first fixed into the connection member, an inclined clamp piece d of the clamp member c bites the corrugated pipe f, or otherwise as illustrated in FIG. 2, when a corrugated pipe f is fitted into a connection member a by fastening a nut e to the connection member with a packing b and a clamp member c first fixed into the connection member, a linear clamp piece d of the clamp member c is simultaneously bent towards the nut e to form an inclined face g, biting the corrugated pipe f.

Further, as illustrated in FIG. 3, another proposed pipe connector is configured such that a pipe f is coupled to a connection member a by fastening a nut e with a clamp member c and a circular-sectional packing b first fixed into the connection member a.

However, such conventional pipe connectors have problems in that airtightness between a distal end of the pipe f and the connection member a is not maintained efficiently since the packing b is placed on the outer circumference of the pipe f, and that the clamp member c is retracted by external force, so that airtightness in the connector is subject to damage.

SUMMARY OF THE INVENTION

Accordingly, the present invention has been made keeping in mind the above problems occurring in the related art, and the present invention is intended to propose a one-touch fitting pipe connector which is able to, only upon insertion, firmly connect a pipe in an airtight manner without the pushing backwards of a clamp member.

In order to achieve the above object, according to an aspect of the present invention, there is provided a pipe connector including: a connection member having a through-hole extending from a connection hole on one side to a coupling hole by way of an insertion hole in a stepped manner; a packing member fitted into the coupling hole; a guide member provided rearwards from the packing member with a tapered opening formed therein; a clamp member fitted into the tapered opening with a plurality of clamp pieces formed slanted so as to bite an outer circumference of a pipe; and a fastening member coupled to the connection member with a fixing section provided on one side with an inclined fixing protrusion protruding inside from the fixing section so as to push up the clamp pieces when inserted into the clamp pieces.

The packing member may be integrally provided on one side with a sealing projection coming into close contact with the outer circumference of the pipe, or otherwise be formed with two rubber rings and a support ring disposed therebetween.

The fixing section may be provided separable from the fastening member such that the fixing section is coupled with the connection member by the fastening member.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings.

Figure 1:
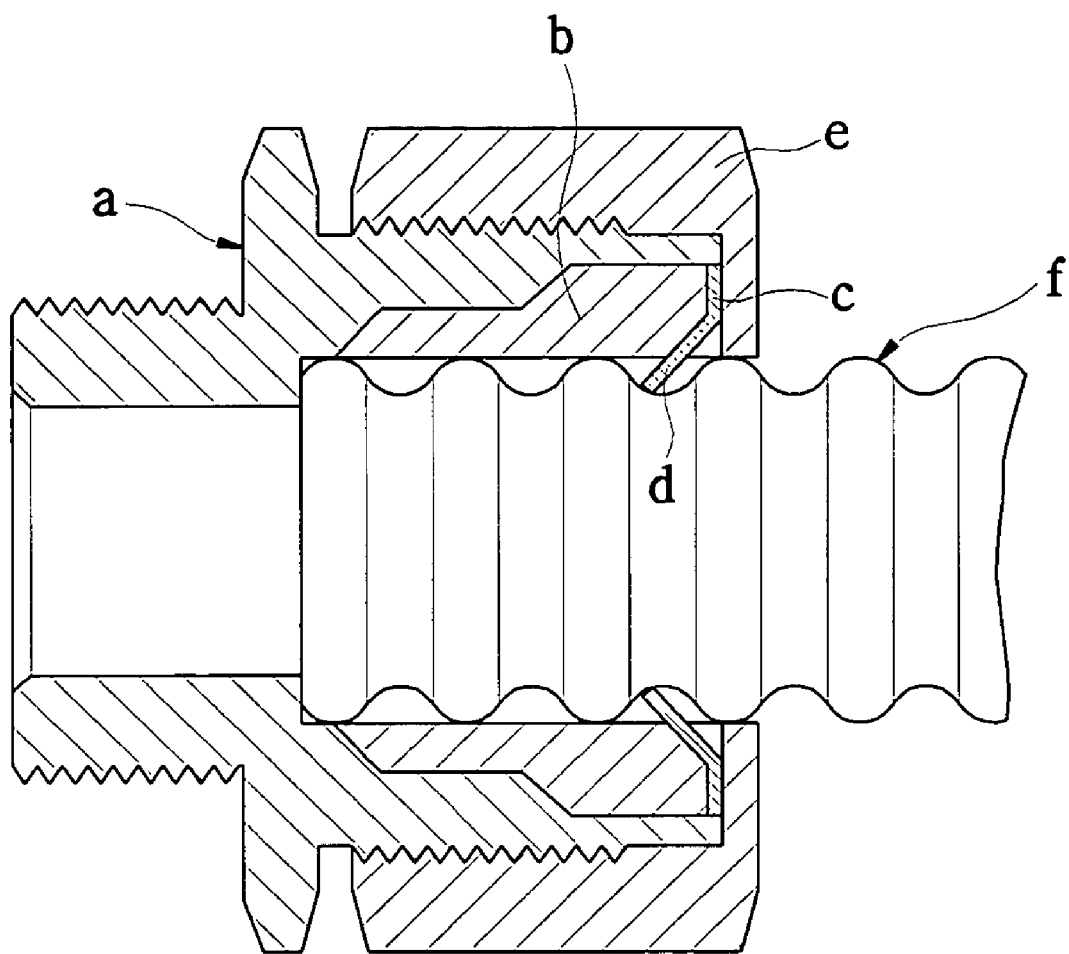
FIG. 1 is a view illustrating an exemplary pipe connector according to a first embodiment of the prior art.
Figure 2:
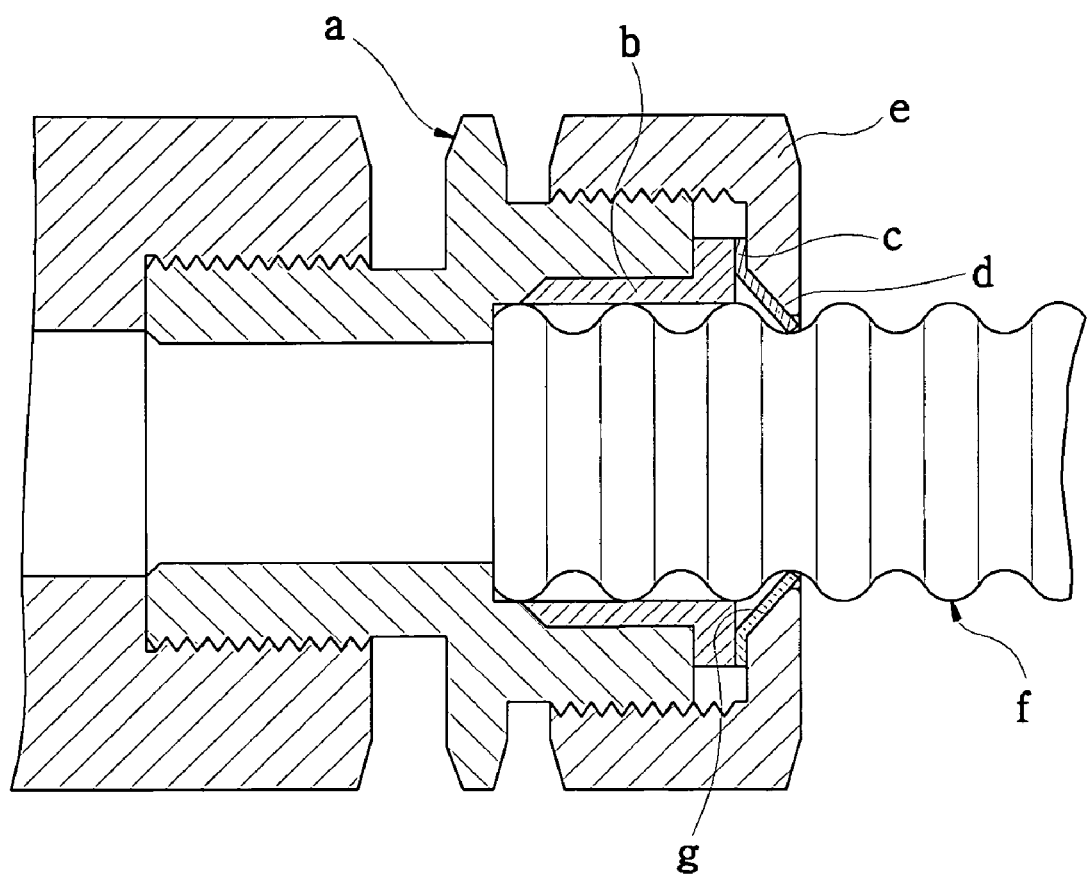
FIG. 2 is a view illustrating an exemplary pipe connector according to a second embodiment of the prior art.
Figure 3:
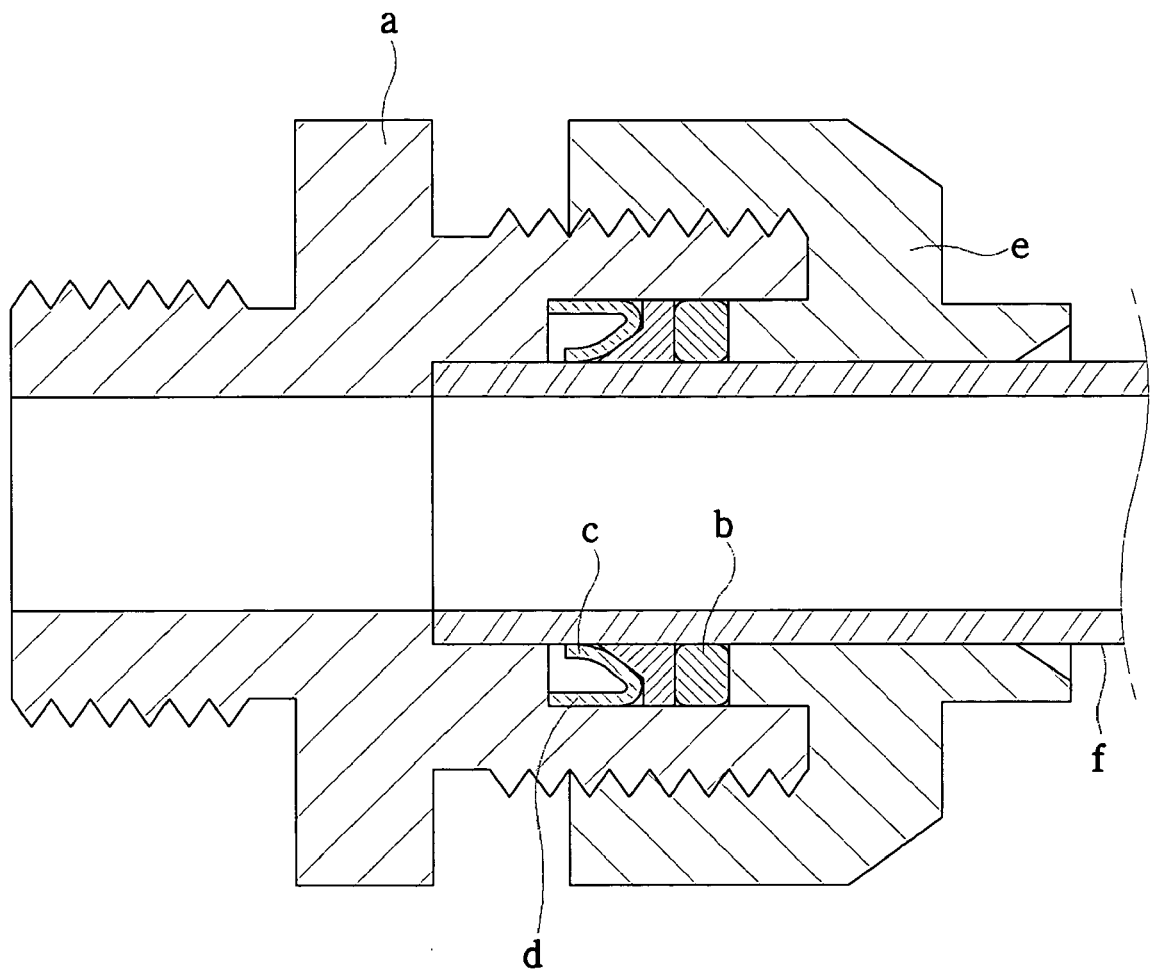
FIG. 3 is a view illustrating an exemplary pipe connector according to a third embodiment of the prior art.
Figure 4:
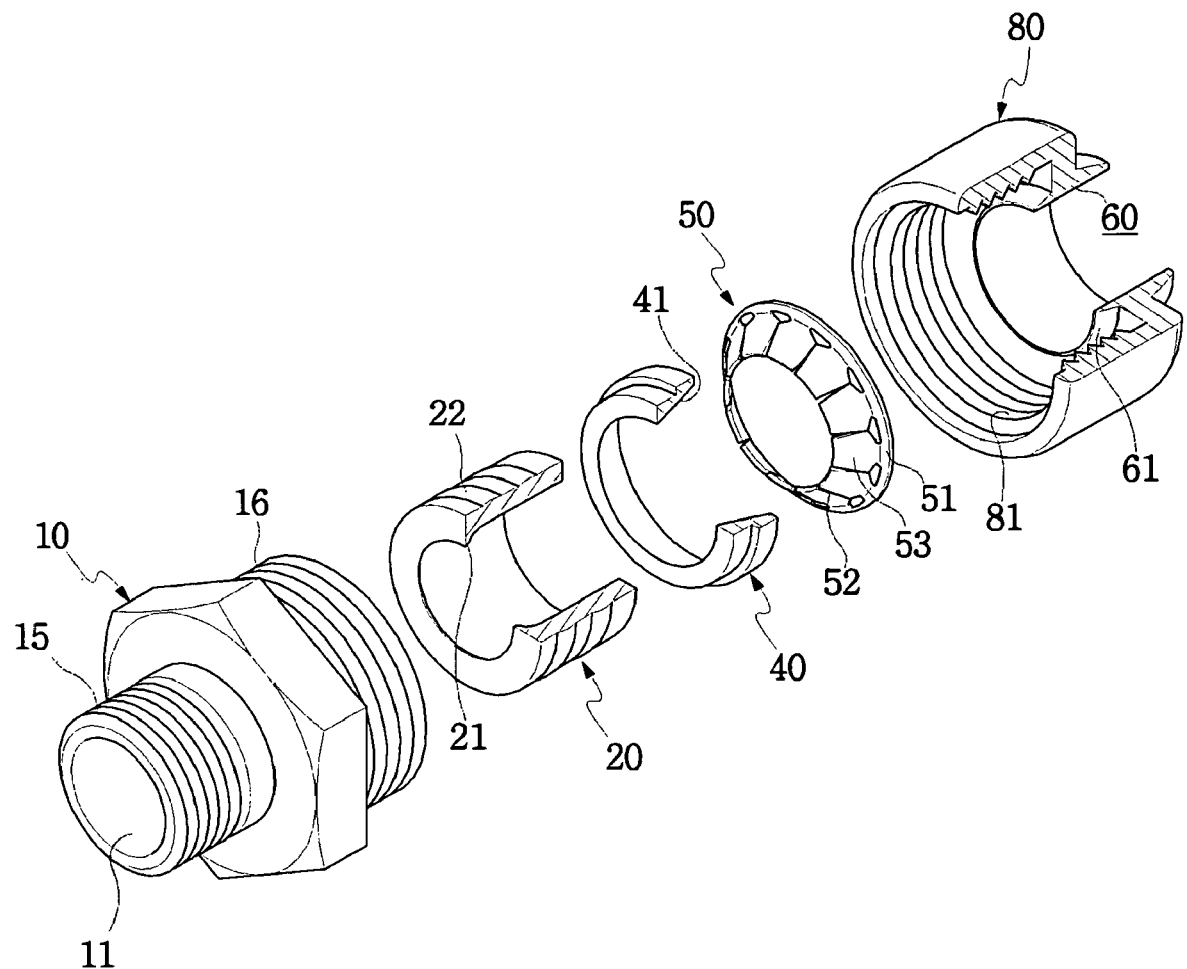
FIG. 4 is an exploded perspective view illustrating a pipe connector according to an embodiment of the present invention.
Figure 5:
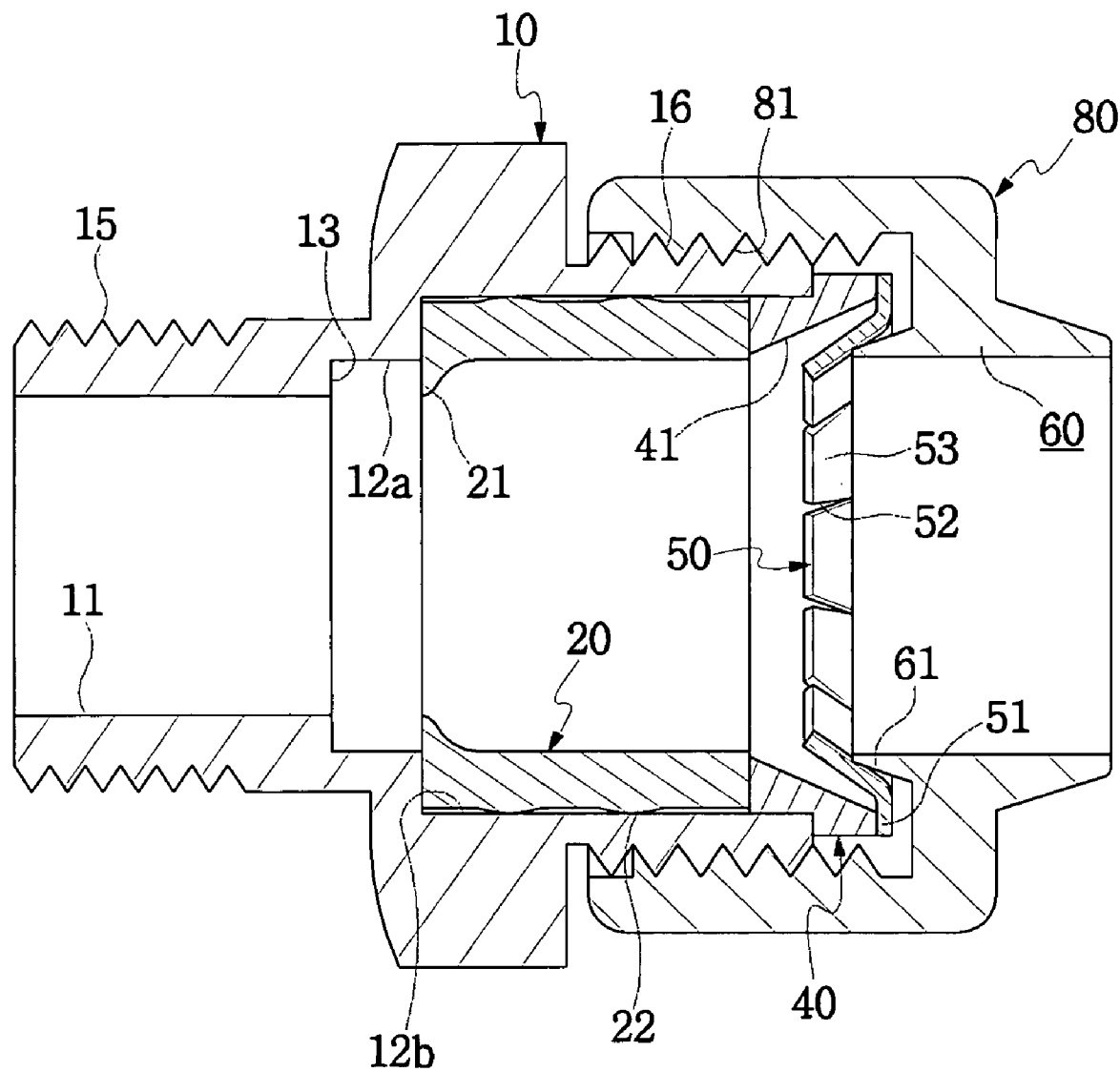
FIG. 5 is a cross-sectional view illustrating the assembled state of the pipe connector according to the embodiment of the present invention.

FIGS. 4 and 5 are views illustrating a pipe connector according to an embodiment of the present invention, wherein the pipe connector includes a connection member 10, a packing member 20, a guide member 40, a clamp member 50, and a first fastening member 80.

The connection member 10 includes a through-hole extending from a connection hole 11 on one side to a coupling hole 12 by way of an insertion hole 12a in a stepped manner. An outer circumference of the connection member 10 is provided on both sides with first and second screws 15 and 16, to which another pipe or device is connected or a nut, namely the first fastening member 80, is fastened, respectively.

The packing member 20 is integrally provided with an inner sealing projection 21 on one side and outer projections 22 on the outer circumference. The sealing projection 21 and the outer projections 22 come into close contact with folds 90a of a corrugated pipe 90 and the coupling hole 12b, respectively. The sealing projection 21 of the packing member 20 is supported by a step 13 formed between the connection hole 11 and the coupling hole 12. When the packing member is fitted into the coupling hole, the outer projections 22 closely adhere onto the circumference of the coupling hole 12, serving to maintain airtightness therebetween.

The clamp member 50 is installed rearwards from the packing member 20 so as to bite the outer circumference of the corrugated pipe 90. The clamp member consists of a fixed part 51 and a plurality of clamp pieces 53 bent slant from the fixed part with cut parts 52 interposed therebetween.

The guide member 40 has a tapered opening 41 defining an inner diameter so as to, upon fitting of the corrugated pipe 90, allow the clamp pieces 53 to become open within a certain range.

The first fastening member 80 is integrally provided, on one side, with a screw hole 81 to be engaged with the second screw 16 of the connection member 10, and on another side with a fixing section 60 protruding towards the inside of the screw hole 81. The fixing section 60 is provided with an inclined fixing protrusion 61 which is fitted into the clamp pieces 53. The inclined fixing protrusion 61 serves to, upon uncoupling of the pipe, push up an under face of the clamp pieces in the coupling hole.

Figure 6:
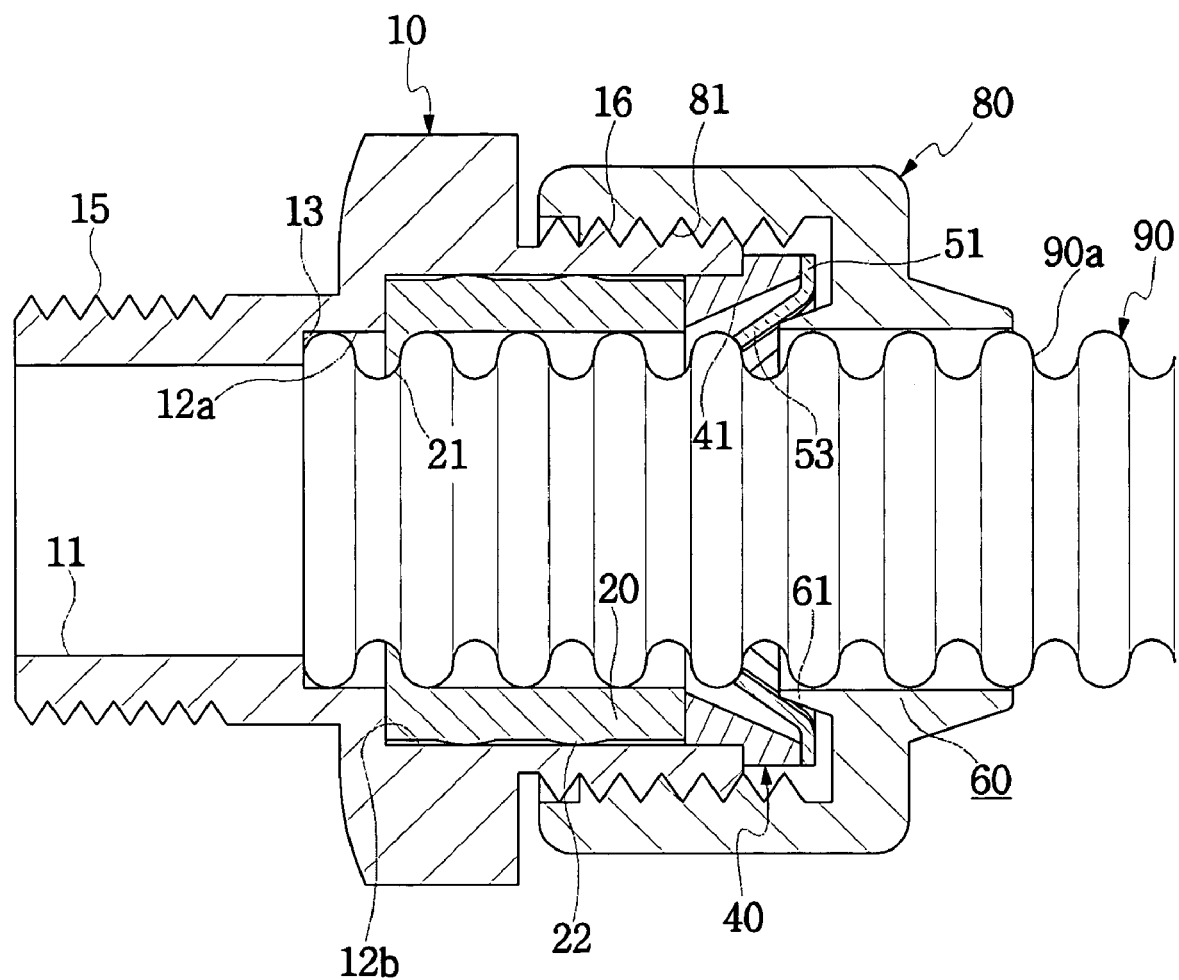
FIG. 6 is a cross-sectional view illustrating the pipe connector to which a corrugated pipe is coupled.

As such, the corrugated pipe 90 is fitted into the pipe connector of the invention from the first fastening member 80 to the insertion hole 12a as illustrated in FIG. 6, wherein the clamp pieces 53 of the clamp member 50 is fixed in a fold 90a of the corrugated pipe 90.

An assembly procedure for the pipe connector is as follows.

The packing member 20, the guide member 40, and the clamp member 50 are first inserted in that order into the coupling hole 12b of the connection member 10, and then the screw hole 81 of the first fastening member 80 is screw-coupled with the second screw 16 of the connection member 10 with the inclined fixing protrusion 61 fitted into the clamp pieces 53 from the rear.

Then, when the corrugated pipe 90 is fitted into the assembled pipe connector from the first fastening member 80, the clamp pieces 53, which are inclined opposite from the insertion direction of the corrugated pipe 90, spread out and then bite the corrugated pipe 90.

When the corrugated pipe 90 has been completely fitted to the insertion hole 12a, the sealing part 21 integrally formed by the packing member 20 becomes fixed in the second fold 90a of the corrugated pipe, resulting in the stable maintenance of airtightness, and the inclined fixing protrusion 61 of the fixing member 60 supports the clamp pieces 53 at the underface in the coupling hole, serving to prevent the corrugated pipe 90 from going back when external force is applied.

Figure 7:
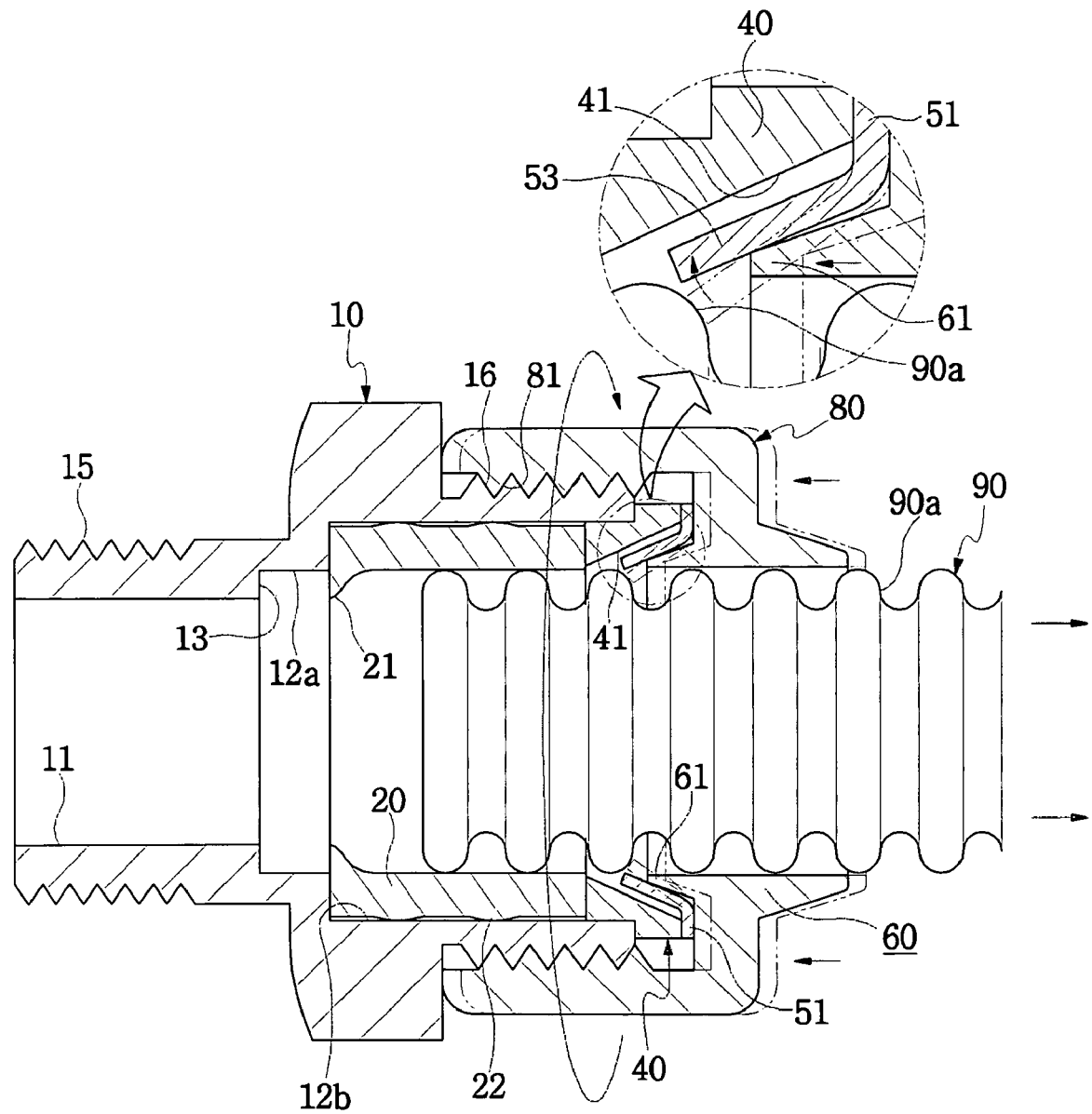
FIG. 7 is a cross-sectional view illustrating the corrugated pipe when it is uncoupled from the pipe connector illustrated in FIG. 6.

FIG. 7 illustrates the first fastening member 80 having been unscrewed to move the fixing section 60 towards the clamp member 50 in order to uncouple the corrugated pipe 90 from the pipe connector.

When the fixing section 60 has moved towards the clamp mender 50, the clamp pieces 53 spread out because of the inclined fixing protrusions 61, so that upon pulling the corrugated pipe 90 out, the pipe is uncoupled from the pipe connector.

Figure 8:
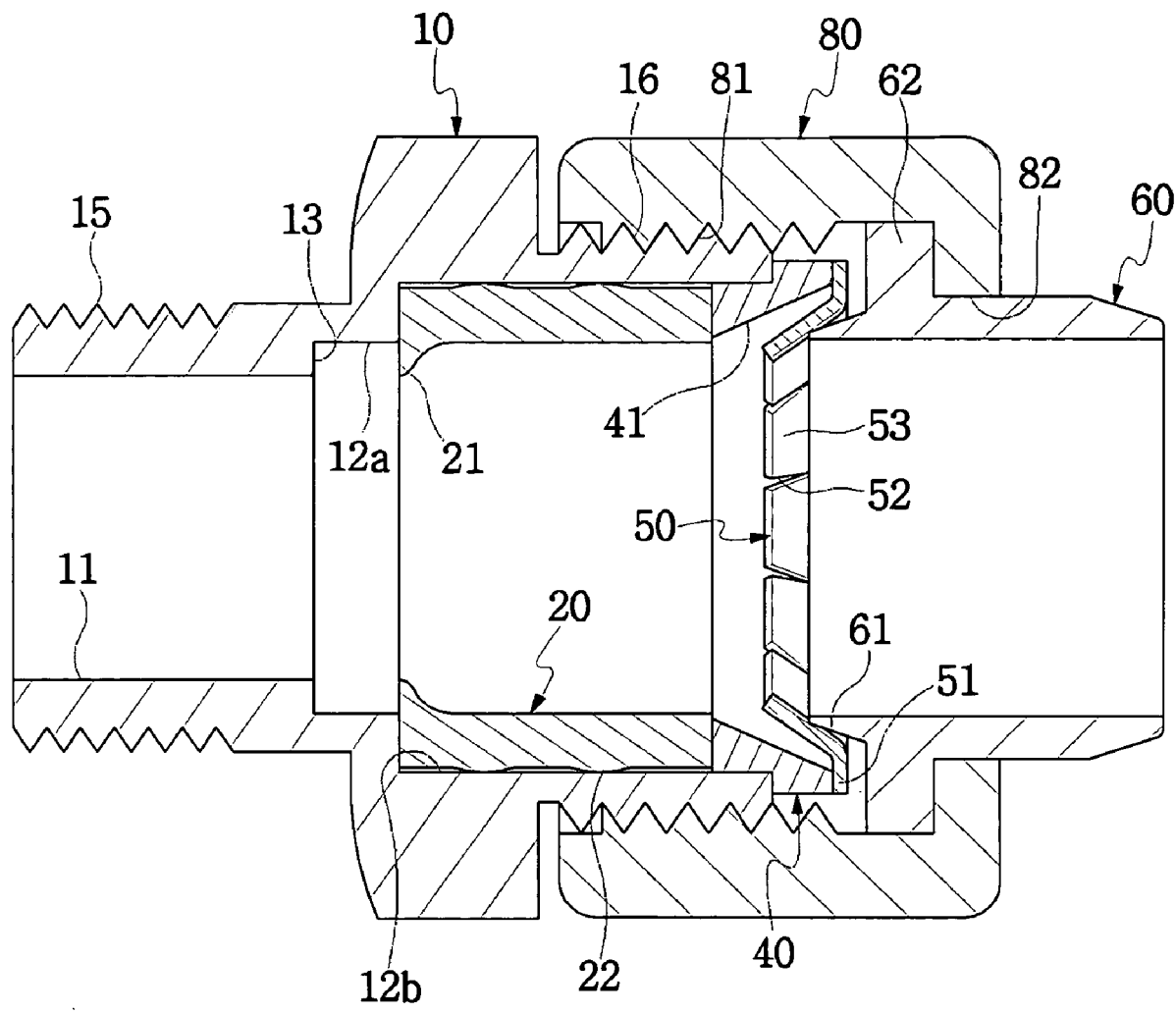
FIG. 8 is a cross-sectional view illustrating an exemplary pipe connector in which a fastening member and a fixing member are screwed to each other.

FIG. 8 illustrates a pipe connector according to another embodiment of the invention in which a fixing section 60 is provided as an individual member separated from the first fastening member 80. In this embodiment, the fixing section 60 (or fixing member) is provided with a coupling protrusion 62 in the middle of an outer circumference, and an inclined fixing protrusion 61 on one side. Herein, another side of the fixing section extends outwards from the coupling protrusion 62 via a center hole 82 of the first fastening member 80.

Figure 9:
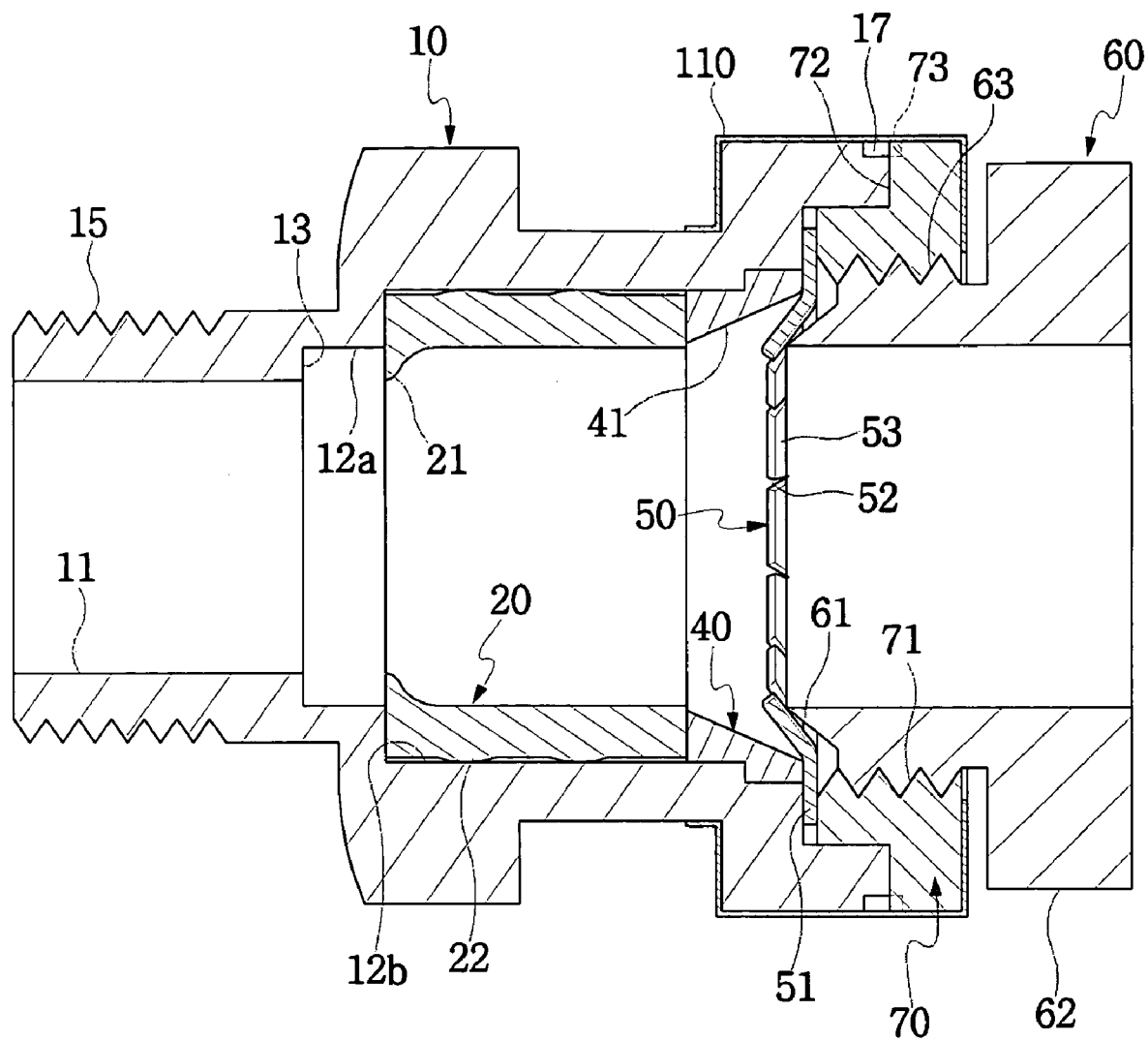
FIG. 9 is a cross-sectional view illustrating an exemplary pipe connector in which a fixing section and a connection member are coupled to each other by bending a fastening member to cover the fixing section and the connection member together.

FIG. 9 illustrates a pipe connector according to another embodiment of the invention, in which a screw part 63 is formed on the outer circumference of the fixing section 60 for screw-coupling with a screw hole 71 of a fastening member 70, an engaging step 73 is provided on an inner face of a protrusion 72 on one side of the fastening member 70, and a second fastening member 110 is bent to cover and couple the circumferences of the fastening member 70 and the connection member 10 with the engaging step 73 fitted into a groove 17 formed on an outer circumference of the connection member 10.

Figure 10:
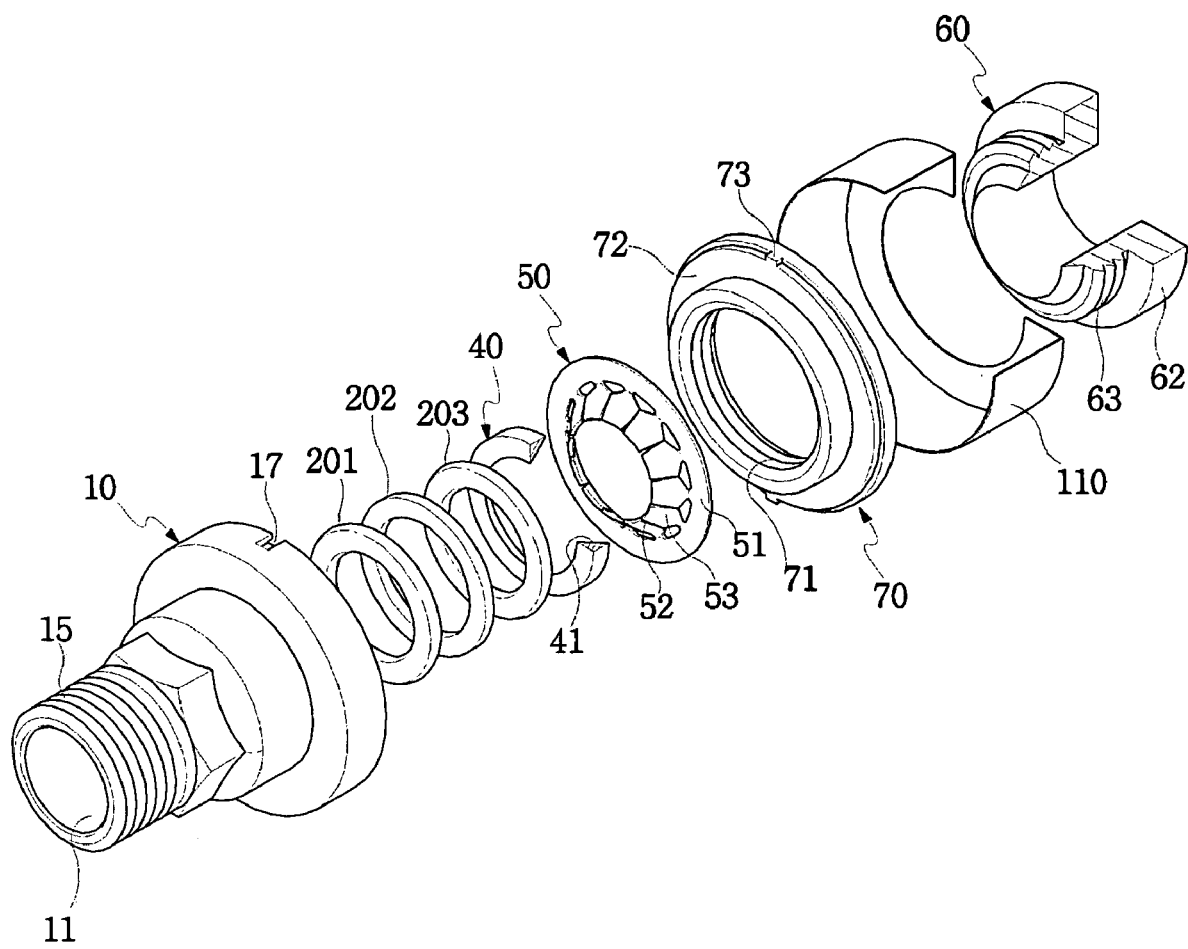
FIG. 10 is an exploded perspective view illustrating an exemplary pipe connector in which a packing member comprises a plurality of rubber rings.
Figure 11:
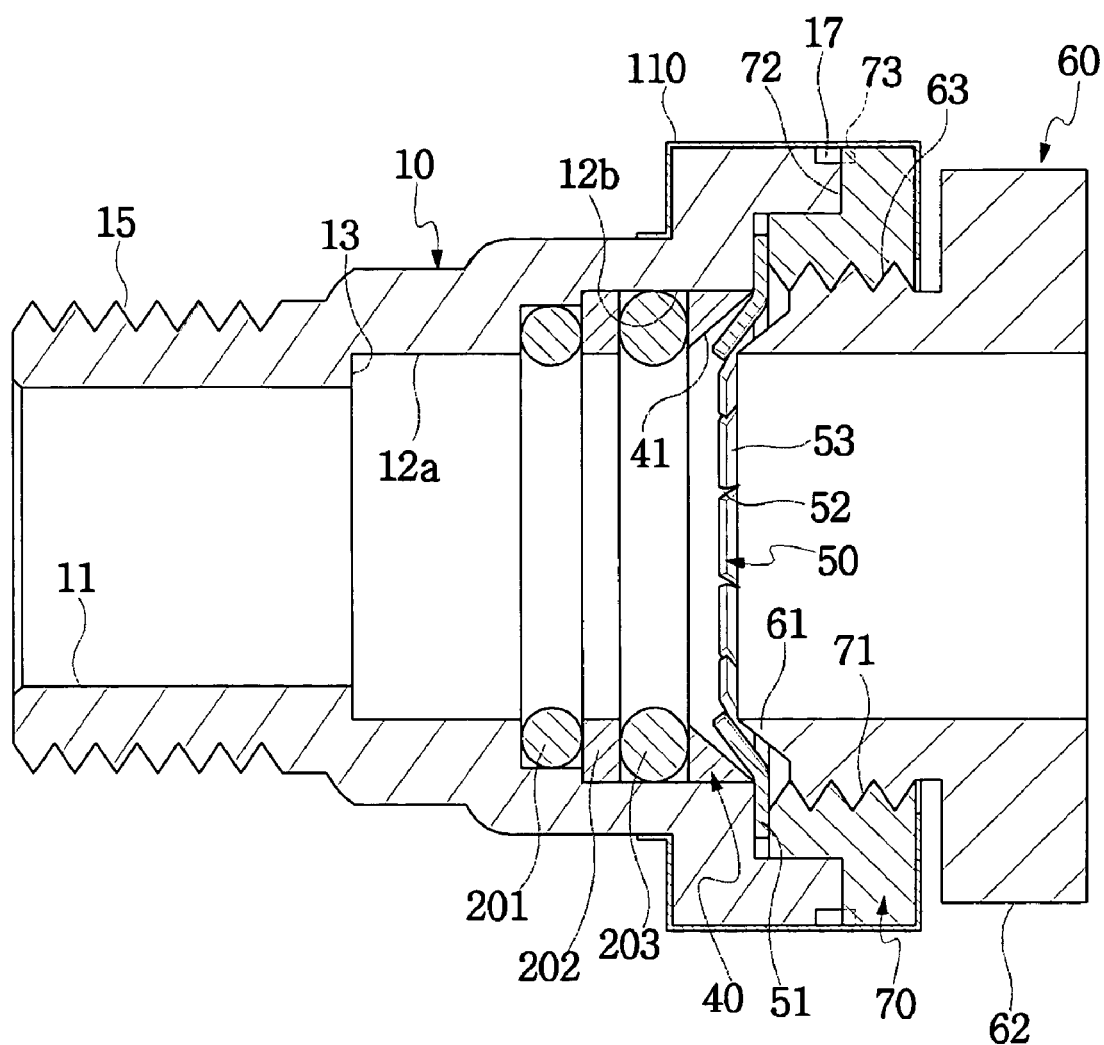
FIG. 11 is a cross-sectional view illustrating the assembled state of FIG. 10.

FIGS. 10 and 11 illustrate a pipe connector according to another embodiment of the invention in which a packing member 20 includes rubber rings 201 and 203 and a support ring 202 interposed therebetween, and a screw part 63 is formed on the outer circumference of the fixing section 60 for screw-coupling with a screw hole 71 of a fastening member 70, an engaging step 73 is provided on an inner face of a protrusion 72 on one side of the fastening member 70, and a second fastening member 110 is bent to cover and couple the circumferences of the fastening member 70 and the connection member 10 with the engaging step 73 fitted into a groove 17 formed on an outer circumference of the connection member 10.

Figure 12:
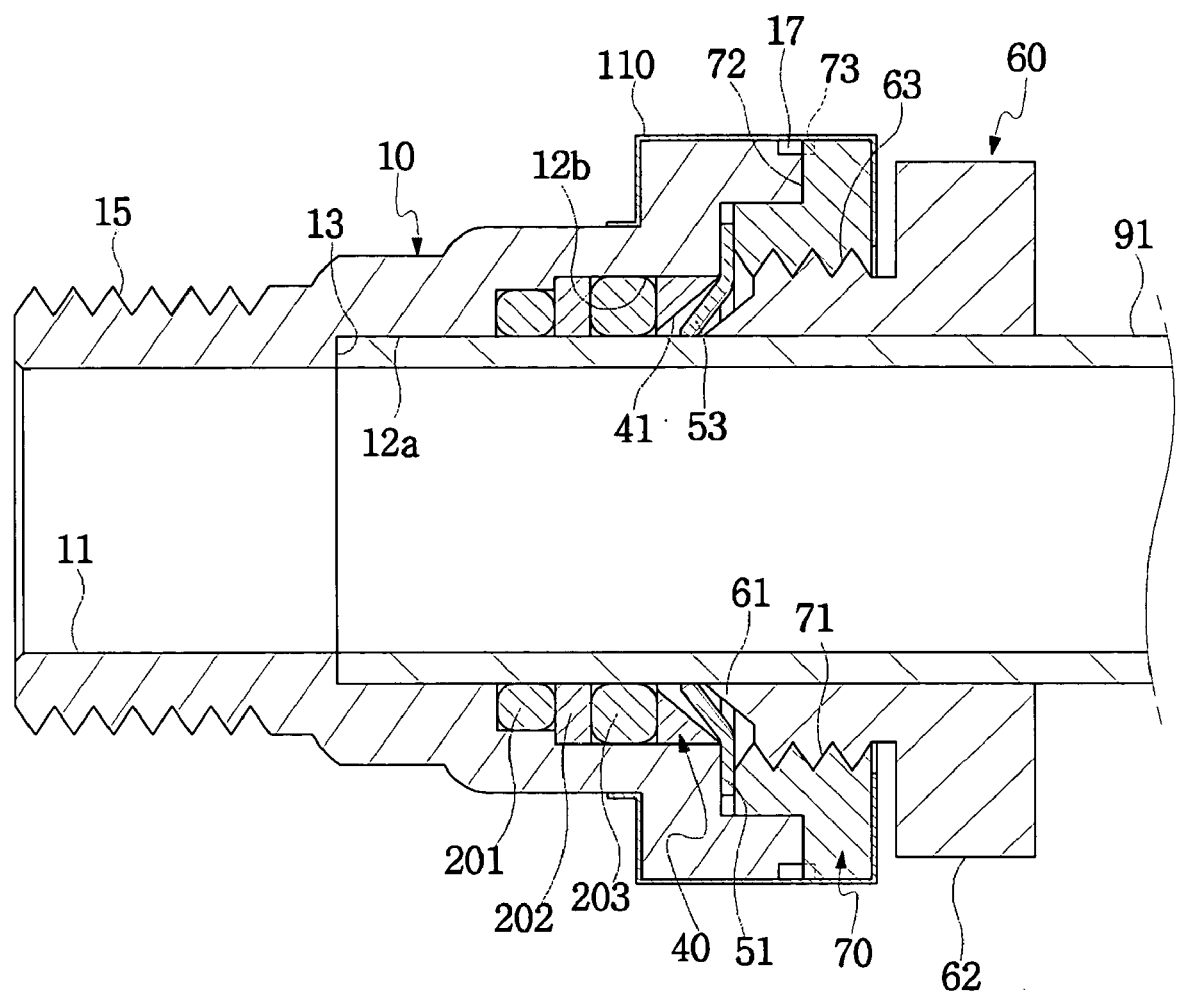
FIG. 12 is a cross-sectional view illustrating the pipe connector of FIG. 11 to which a pipe has been coupled.

FIG. 12 illustrates the state in which a pipe 91 with a constant diameter is fitted into the pipe connector of FIG. 11, wherein the rubber rings 201 and 203 and the support ring 202 (i.e. the packing member 20), the guide member 40, and the clamp member 50 are first fitted into the coupling hole 12b; the second fastening member 110 is fitted and bent to cover and couple the connection member 10 and the fastening member 70; and the screw part 63 of the fixing section 60 is screw-coupled with the screw hole 71, thereby assembling the pipe connector. Herein, since the engaging step 73 is fitted into the groove 17 of the connection member 10, the fastening member 70 does not rotate.

In this state, when the pipe 91 has been completely fitted into the insertion hole 12a, the rubber rings come into close contact with the outer circumference of the pipe 91, maintaining stable airtightness therebetween, and the inclined fixing protrusion 61 of the fixing section 60 is placed in the clamp pieces 53, preventing the corrugated pipe 90 from going back upon the application of an external force.

Figure 13:
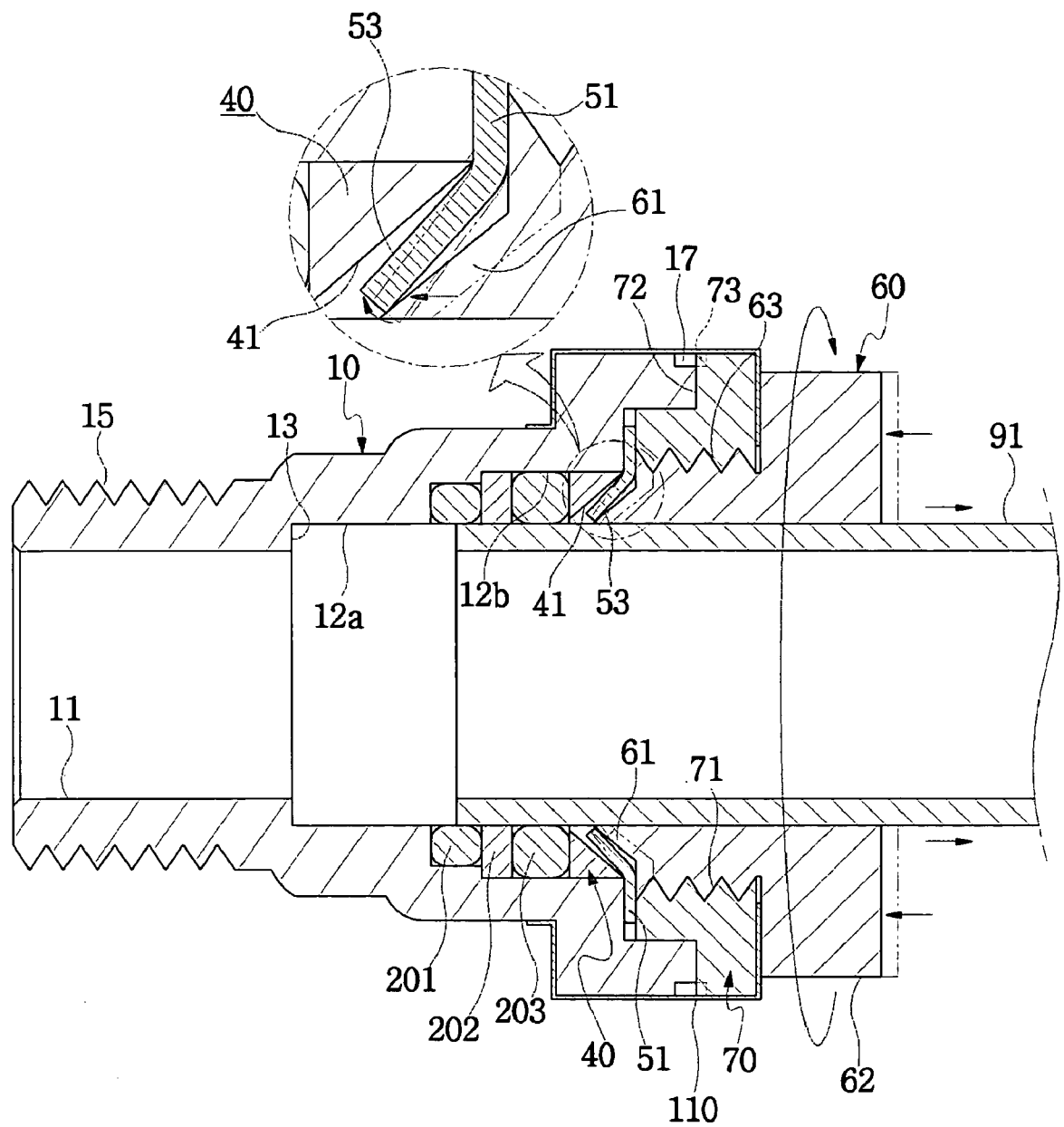
FIG. 13 is a cross-sectional view illustrating a pipe when it is uncoupled from the pipe connector of FIG. 12.

FIG. 13 illustrates the state in which the fixing section 60 is moved towards the clamp member 50 in order to uncouple the pipe 90 from the pipe connector. When the fixing section 60 is moved towards the clamp member 50, the clamp pieces 53 spread out because of the inclined fixing protrusion 61, so that upon pulling out, the corrugated pipe 90 is uncoupled from the pipe connector.

The embodiments of the packing member 20, the fixing section 60, and the fastening member may of course be selectively adapted to be one or more so as to implement the present invention.

According to the present invention, when a worker does no more than just fit the corrugated pipe 90 or the plain pipe 91 into the pipe connector, the clamp pieces 53 of the clamp member 50 bite and couple the pipe. Further, when the worker tightens the fixing section 60, the inclined fixing protrusion 61 of the fixing section 60 pushes up the clamp pieces, allowing the pipe 90 or 91 to be easily uncoupled from the pipe connector.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pipe connector comprising:
    a connection member having a stepped coupling hole extending therethrough;
    a packing member fitted into the coupling hole;

a guide member provided rearwards from the packing member with a tapered opening formed therein;
a clamp member fitted into the tapered opening of the guide member with a plurality of clamp pieces slanted so as to bite an outer circumference of a pipe;
a fastening member coupled to the connection member,
a fixing section provided with an inclined fixing protrusion protruding inside the fastening member in contact with the clamp pieces so as to maintain a position of the clamp pieces on the pipe and to push forward the clamp pieces towards the connection member when the inclined fixing protrusion is further inserted into engagement with the clamp pieces to allow release of the pipe,
a screw part formed on an outer circumference of the fixing section for screw-coupling with a screw hole of the fastening member,
an engaging step provided on an inner face of a protrusion on one side of the fastening member, and
a second fastening member bent to cover and couple circumferences of the fastening member and the connection member with the engaging step fitted into a groove formed on an outer circumference of the connection member.

2. The pipe connector according to claim 1, wherein the packing member is integrally provided with an inner sealing projection on one side and outer projections on an outer circumference, the outer projections coming into close contact with the coupling hole.

3. The pipe connector according to claim 1, wherein the packing member consists of two rubber rings and a support ring interposed between the two rubber rings.

4. The pipe connector according to claim 1, wherein the fixing section is provided with a coupling protrusion on an outer circumference, and another side of the fixing section extends from the coupling protrusion into a center hole of the fastening member.

5. A pipe connector comprising:
a connection member having a stepped coupling hole extending therethrough;
a packing member fitted into the coupling hole;
a guide member provided rearwards from the packing member with a tapered opening formed therein;
a clamp member fitted into the tapered opening of the guide member with a plurality of clamp pieces slanted so as to bite an outer circumference of a pipe;
a fastening member coupled to the connection member, and
a fixing section provided with an inclined fixing protrusion protruding inside the fastening member so as to push forward the clamp pieces towards the connection member when the inclined fixing protrusion is further inserted into engagement with the clamp pieces to allow release of the pipe,
a screw part formed on an outer circumference of the fixing section for screw-coupling with a screw hole of the fastening member,
an engaging step provided on an inner face of a protrusion on one side of the fastening member, and
a second fastening member bent to cover and couple circumferences of the fastening member and the connection member with the engaging step fitted into a groove formed on an outer circumference of the connection member.

* * * * *